United States Patent
Babin et al.

(10) Patent No.: US 7,320,589 B2
(45) Date of Patent: Jan. 22, 2008

(54) HOT RUNNER MANIFOLD PLUG FOR RHEOLOGICAL BALANCE IN HOT RUNNER INJECTION MOLDING

(75) Inventors: Denis Babin, Georgetown (CA); Gino Colonico, Georgetown (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 484 days.

(21) Appl. No.: 10/786,017

(22) Filed: Feb. 26, 2004

(65) Prior Publication Data

US 2004/0164459 A1    Aug. 26, 2004

Related U.S. Application Data

(60) Provisional application No. 60/449,597, filed on Feb. 26, 2003.

(51) Int. Cl.
 *B29C 45/00* (2006.01)
(52) U.S. Cl. .................. 425/572; 425/588; 264/328.8; 264/328.12
(58) Field of Classification Search .......... 425/572, 425/588, 338, 234; 264/328.8, 328.12
See application file for complete search history.

(56) References Cited

U.S. PATENT DOCUMENTS

| | | |
|---|---|---|
| 3,696,840 A | 10/1972 | Odhner |
| 4,123,496 A | 10/1978 | Gallizia et al. |
| 4,292,018 A | 9/1981 | Beale |
| 4,299,553 A * | 11/1981 | Swaroop .............. 425/572 |
| 4,303,382 A | 12/1981 | Gellert |
| 4,403,933 A | 9/1983 | Davis et al. |
| 4,443,178 A | 4/1984 | Fujita |
| 4,469,649 A | 9/1984 | Ibar |
| 4,781,879 A | 11/1988 | Oishi |
| 4,848,920 A | 7/1989 | Heathe et al. |

(Continued)

FOREIGN PATENT DOCUMENTS

CA    1 165 525    4/1984

(Continued)

OTHER PUBLICATIONS

"Efficient Spiral Flow 3-D Microchannel", published at <http://www.shoji.comm.waseda.ac.jp/~mf/mfeg/Sprialflow.htm>, Shoji Laboratory, Waseda University, Japan, (unknown).

(Continued)

*Primary Examiner*—Yogendra N. Gupta
*Assistant Examiner*—Maria Veronica Ewald
(74) *Attorney, Agent, or Firm*—Medler Ferro PLLC

(57) ABSTRACT

A method and apparatus for rotating a cross-sectional asymmetrical condition of a laminar flowing material is provided in a hot runner system for supplying a laminar flowing material. The hot runner system has (i) an upstream melt passage, (ii) a pair of intermediary melt passages downstream from the upstream melt passage, and (iii) for at least one intermediary melt passage, an associated pair of downstream melt passages downstream from the at least one intermediary melt passage. The cross-sectional asymmetrical condition of a laminar flowing material is rotated by providing a bending path for orienting at least one path outlet relative to a path inlet to rotate the cross-sectional asymmetrical condition of the laminar flowing material such that the cross-sectional asymmetrical condition is substantially equally divided between the two downstream portions.

18 Claims, 13 Drawing Sheets

U.S. PATENT DOCUMENTS

| | | | |
|---|---|---|---|
| 4,965,028 | A | 10/1990 | Maus et al. |
| 5,069,840 | A | 12/1991 | Arnott |
| 5,192,556 | A | 3/1993 | Schmidt |
| 5,262,119 | A | 11/1993 | Smith |
| 5,421,715 | A | 6/1995 | Hofstetter et al. |
| 5,554,395 | A | 9/1996 | Hume et al. |
| 5,683,731 | A | 11/1997 | Deardurff et al. |
| 5,688,462 | A | 11/1997 | Salamon et al. |
| 5,783,234 | A | 7/1998 | Teng |
| 5,916,605 | A | 6/1999 | Swenson et al. |
| 5,941,637 | A | 8/1999 | Maurer |
| 5,955,121 | A | 9/1999 | Gellert et al. |
| 6,077,470 | A | 6/2000 | Beaumont |
| 6,089,468 | A | 7/2000 | Bouti |
| 6,235,230 | B1 | 5/2001 | Puniello |
| 6,349,886 | B1 | 2/2002 | Bouti |
| 6,382,528 | B1 | 5/2002 | Bouti |
| 6,450,798 | B1 | 9/2002 | Choi et al. |
| 6,503,438 | B2 | 1/2003 | Beaumont et al. |
| 6,544,028 | B2 | 4/2003 | Wright et al. |
| 6,572,361 | B2 | 6/2003 | Gould et al. |
| 6,245,278 | B1 | 6/2004 | Lausenhammer et al. |
| 2002/0070288 | A1 | 6/2002 | Bouti |
| 2002/0086086 | A1 | 7/2002 | Doyle et al. |
| 2002/0149135 | A1* | 10/2002 | Choi et al. ............... 264/328.8 |
| 2004/0047943 | A1 | 3/2004 | White et al. |
| 2004/0130062 | A1 | 7/2004 | Sicilia |
| 2004/0256768 | A1 | 12/2004 | Olaru |
| 2004/0265422 | A1 | 12/2004 | Sabin et al. |
| 2005/0238758 | A1 | 10/2005 | Ciccone et al. |

FOREIGN PATENT DOCUMENTS

| | | |
|---|---|---|
| DE | 20 17 710 A1 | 10/1970 |
| DE | 3201710 A1 | 8/1982 |
| EP | 0 293 756 A2 | 12/1988 |
| EP | 0 293 756 A3 | 12/1989 |
| EP | 0 779 140 A1 | 6/1997 |
| EP | 0 963 829 A1 | 12/1999 |
| EP | 1140456 B1 | 10/2001 |
| JP | 2-178012 | 7/1990 |
| JP | 10-006363 A | 1/1998 |
| WO | WO 01/34365 A1 | 5/2001 |
| WO | WO 03/008173 A1 | 1/2003 |
| WO | WO-03/011443 A2 | 2/2003 |
| WO | WO-03/035 358 A1 | 5/2003 |

OTHER PUBLICATIONS

"Hot Runner Nozzles Increase Performance", Abstract, <www.tool-moldmaking.com>, *European Tool & Mould Making, Husky Injection Molding Systems S.A.*, (Oct. 2001).

"Husky Introduces Ultraflow for Ultra Hot Runner Nozzles", *News Release, Husky Injection Molding Systems Ltd.*, (Jun. 23, 2003).

"Melt Mixing Technology Improves Part Quality", *News Release, Husky Injection Molding Systems Ltd.*, (Aug. 9, 2001).

"New UltraFlow Tip Improves Melt Homogeneity and Part Quality", *News Release, Husky Injection Molding Systems Ltd.*, (Oct. 20, 2004).

"Nozzle Tip Handles Quick Colour Changes", Abstract, <www.tool-moldmaking.com>, *European Tool & Mould Making Husky Injection Molding Systems S.A.*, (May/Jun. 2001).

"Stable Melt Profile Means Uniform Part Quality", Abstract, <www.tool-moldmaking.com>, *European Tool & Mould Making, Husky Injection Molding Systems S.A.*, (Jul./Aug. 2002).

"When Mixing It Is a Good Idea", Abstract, <www.tool-moldmaking.com>, *European Tool & Mould Making, Husky Injection Molding Systems S.A.*, Nov./Dec. 2001.

Blundy, J , "Improving Shear Induced Imbalance in Hot Runner Systems", *INCOE Corporation*, (Jun. 25, 2004).

Strook, Abraham D., "Microsystems, Microfluidic Transport, an Colloid Science", Cornell University Website at http://web1temp.cheme.cornell.edu/peopleevents/faculty/stroock/research.htm, (unknown).

Wright, Corin, "Improving Color Change in Hot Runner Molds", *Plastics Machinery & Auxiliaries*, (Apr. 2003).

Beaumont, John P., et al., "Solving Mold Filling Imbalances in Multi-cavity Injection Molds", *Journal of Injection Molding Technology*, (Jun. 1998, vol. 2, No. 2),47-58.

\* cited by examiner

HOT RUNNER MANIFOLD PLUG FOR RHEOLOGICAL BALANCE IN HOT RUNNER INJECTION MOLDING

FIELD OF THE INVENTION

This invention relates to an injection molding apparatus and, more specifically, to a multi-cavity injection molding apparatus that includes a balanced hot runner layout in a stack mold or manifold.

BACKGROUND OF THE INVENTION

The use of stack molds and manifolds in a hot runner injection molding apparatus is well known. Furthermore, it is well known that in many applications it is important that a runner layout be provided such that each cavity receives the same flow of melt having the same temperature and the same composition. Balancing of the runner system results in overall higher quality molded parts because consistency is achieved from mold cavity to mold cavity in a multi-cavity application. Even in multi-runner, single cavity applications, the benefits of balancing are well known and important.

A well-known technique for balancing a manifold or stack mold is to match runner diameters and lengths and to match the number of turns in the runners, so that the pressure drop through the manifold or stack mold to each cavity is the same. Occasionally, however, different flows are provided to different cavities, in spite of the runner layout having matched runner lengths and turns. This is at least partly due to a combination of shear heating of the melt flow combined with the layout of the runner system.

When melt is forced under pressure through a bore, as is done in a hot runner system whether in a manifold or a stack mold, the melt experiences friction or shear in the area adjacent to the channel wall. This results in a localized elevation of the temperature of the melt. The result is a differential in temperature across the bore, with the center of the channel being cooler than the material closer to the bore. Many hot runner systems split the melt flow from a primary runner through two or more secondary runners. When this occurs, the heat distribution profile in the melt is divided as well. This occurs because the flow through the runners is laminar, and therefore the shear-heated material remains adjacent to the wall as the corner is turned. After the corner, the heated peripheral portion is no longer annular, but is instead generally crescent-shaped and remains on one side of the melt flow. The mass flow through each of the secondary runners is substantially equal; however, the heated peripheral portion in each secondary runner is asymmetrically distributed about the periphery. If, as is usually the case, each secondary runner is divided into a plurality of tertiary runners, the asymmetric heated peripheral portion may be unequally divided between these plurality of tertiary runners. As a result, the material flowing into one of the tertiary runners from a secondary runner may include a higher proportion of shear-heated material compared to the melt flowing into the other of the tertiary runners downstream from that secondary runner. This phenomenon can, in some applications, cause preferential flow to some drop locations, and can cause out-of-spec product from portions of a molding machine. Specifically, there will typically be preferential flow to the tertiary runner receiving a higher proportion of shear-heated material from its upstream secondary runner compared to the other of the tertiary runners fed by that secondary runner.

This problem of asymmetric division of shear-heated material has been recognized in a cold runner context; however, it has not been as clearly recognized in a hot runner context. That is, melt in a hot runner is typically less viscous than in a cold runner. As a result, shear-induced heating has been thought of as less of a problem, as there is less resistance to shear. Instead, imbalance of flow in hot runner context has been attributed to other factors.

Different devices have been developed to address the problem for both cold runner and hot runner applications. In cold runner injection, the mold component includes the runners as well as the mold cavities. The mold component is made up of two halves that mate together. All the runners and the mold cavities lie in the plane of the mating faces of the two halves. At the end of an injection cycle the mold component is parted and the molded parts and the solidified melt in the runners are ejected. Cold runner layouts are typically simple in nature since all the runners lie on a common plane.

For cold runner applications, U.S. Pat. No. 4,123,496 to Gallizia et al. discloses an equalization device in a conduit carrying a melt flow, wherein different portions of the melt flow are reoriented to achieve a relatively uniform heat distribution in the melt flow.

U.S. Pat. No. 6,077,470 to Beaumont discloses a similar device for achieving similar balancing results in cold runner applications. Beaumont discloses a device for achieving balanced melt flow in cold runner applications. The device is positioned upstream of the split that first produces an asymmetric flow. Beaumont's device applies to cold runners particularly because the device is dependent on the simple, planar nature of the cold runner mold. Beaumont's device, for example, would not be applicable in a situation in which one of the runners from a downstream split extended out of the plane of the parting line of the mold component.

Hot runner stack mold systems typically include a plurality of mold components, which taken together, define a hot runner system and a plurality of mold cavities. Similarly, hot runner manifolds provide a hot runner system for providing melt to a plurality of mold cavities. In a stack mold, the primary runner or upstream runner of the runner system is typically provided by passages in a first, second and third mold component. In such stack molds, the second mold component is between and adjoins the first mold component and the third component. In the third mold component, the primary runner divides into two secondary runners. One of these secondary runners proceeds back into the second mold component where it divides into a pair of tertiary runners. The other of the secondary runners projects into the fourth mold component where it divides into two tertiary runners. The tertiary runners in the second and fourth mold components then provide melt to cavities in the third mold component. In operation, the second, third and fourth mold components are separable to eject the formed product from the mold cavities. Because of the differences in hot runner and cold runner systems, cold runner technologies are not typically applied to hot runner molding machines. For hot runner systems, other devices have been developed.

European Patent Application No. 963,829 to Goldwin et al. discloses the use of cylindrical heaters positioned at different points in a hot runner manifold. The heaters are positioned around the runners themselves and heat the melt passing through the runners so that cooler portions of the melt flow are heated to a temperature similar to the shear-heated portions of the melt flow.

U.S. Pat. No. 5,683,731 to Deardurff et al. discloses a device for use in hot runner manifolds having a double X layout. The device separates the hotter portion of an asymmetric shear-heated melt flow and redistributes it into each runner of the X, so that the runners receive melt having roughly equal temperatures.

Also for hot runner systems, it is known to pass a melt flow through one or more static mixers positioned in the runners. This creates a relatively uniform heat distribution so that any downstream split in a runner system divides the heat content in the melt flow generally equally in the runners after the split. Many injection molders, however, perform color changes during production runs and cannot tolerate cross-contamination between successive colors. Static mixers have complex internal structures, and are therefore difficult and time consuming to clean, making them poorly suited to many injection molding applications, such as those where color changes are common and cross-contamination is not tolerated.

Accordingly, there is a need for a hot runner system that offers improved balancing of the resin melt flows while facilitating efficient resin color changes between molding operations.

SUMMARY OF THE INVENTION

An object of an aspect of the present invention is to provide an improved injection molding method.

In accordance with this first aspect of the present invention, there is provided a method of controlling a cross-sectional asymmetric condition of a laminar flowing material. The method comprises (a) providing a hot runner system, the hot runner system having an upstream melt passage, a plurality of intermediary melt passages downstream from the upstream melt passage, and for at least one of the intermediary melt passage, an associated pair of downstream melt passages downstream from the intermediary melt passage; (b) providing the laminar flowing material to the hot runner system; (c) heating the laminar flowing material within the hot runner system; and, (d) for the at least one intermediary melt passage, orienting one of (i) the cross-sectional asymmetric condition of the laminar flowing material in the intermediary melt passage, and (ii) the associated plurality of downstream melt passages, such that the cross-sectional asymmetric condition is substantially equally divided between the associated two downstream melt passages.

An object of a second aspect of the present invention is to provide an improved injection molding apparatus.

In accordance with this second aspect of the present invention, there is provided an injection molding apparatus comprising: (a) a hot runner system for supplying a laminar flowing material, the hot runner system having (i) an upstream melt passage, (ii) a plurality of intermediary melt passages downstream from the upstream melt passage, and (iii) for at least one intermediary melt passage, an associated pair of downstream melt passages downstream from the intermediary melt passage; (b) for the upstream melt passage and the at least one intermediary melt passage, a flow path for orienting the cross-sectional asymmetric condition of the laminar flowing material in the at least one intermediary melt passage such that the cross-sectional asymmetric condition is substantially equally divided between the associated pair of downstream melt passages; and, (c) a plurality of hot runner nozzles in communication with and downstream from the downstream melt passages.

An object of a third aspect of the present invention is to provide an improved injection molding apparatus.

In accordance with this third aspect of the present invention, a flow rotator for rotating a cross-sectional asymmetrical condition of a laminar flowing material is provided in a hot runner system for supplying a laminar flowing material. The hot runner system has (i) an upstream melt passage, (ii) a pair of intermediary melt passages downstream from the upstream melt passage, and (iii) for at least one intermediary melt passage, an associated pair of downstream melt passages downstream from the at least one intermediary melt passage. The flow rotator comprises: (a) an inlet for receiving the laminar flowing material; (b) at least one outlet for discharging the laminar flowing material; and, (c) a bending path for orienting the at least one outlet relative to the inlet to rotate the cross-sectional asymmetrical condition of the laminar flowing material such that the cross-sectional asymmetrical condition is substantially equally divided between the two downstream portions.

BRIEF DESCRIPTION OF THE DRAWINGS

For a better understanding of the present invention and to show more clearly how it may be carried into effect, reference will now be made by way of example to the accompanying drawings, showing articles made according to a preferred embodiment of the present invention, in which.

DETAILED DESCRIPTION OF THE INVENTION

Figure 1A:
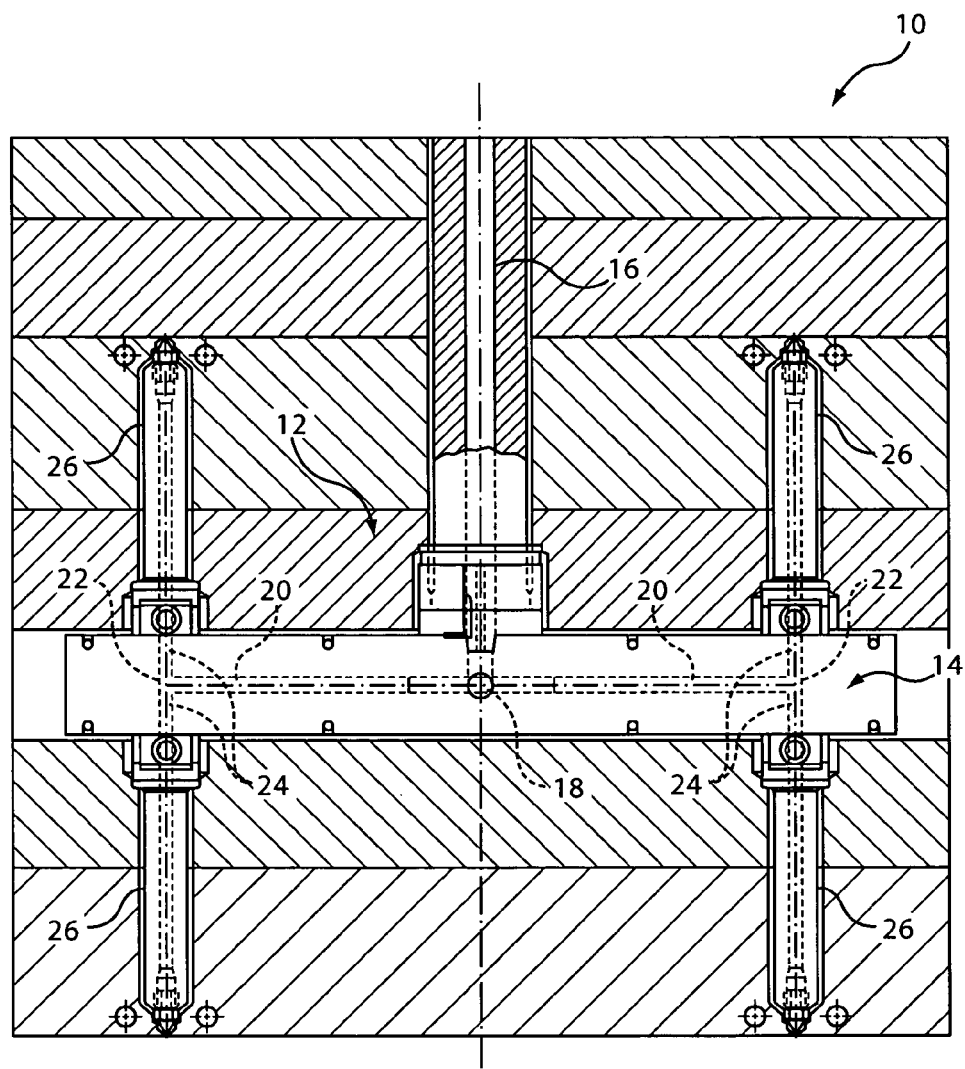
FIG. 1a, in a side view, illustrates a portion of a stack mold in accordance with the prior art.

Referring to FIG. 1a, there is illustrated in a side view, a portion of a stack injection molding apparatus 10 in accordance with the prior art. The stack injection molding apparatus 10 includes a runner system 12 including a manifold 14. The runner system 12 includes a primary runner 16 for receiving melt from a melt source (not shown). At a first branch 18, the primary runner 16 branches into two secondary runners 20. The secondary runners 20, at respective second branches 22, then branch into tertiary runners 24. The tertiary runners 24 supply melt to associated nozzles 26, which inject the melt into associated mold cavities (not shown).

Figure 1B:
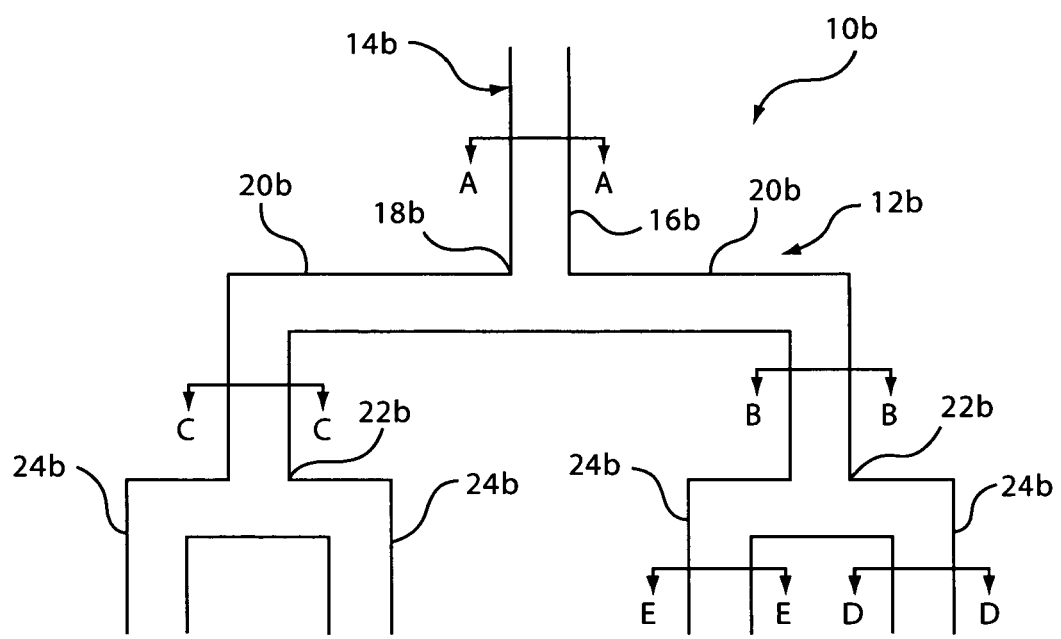
FIG. 1b, in a schematic side view, illustrates a hot runner manifold in accordance with the prior art.

Referring to FIG. 1b, there is illustrated in a side view, a manifold 14b of an injection molding apparatus 10b in accordance with the prior art. The manifold 14b includes a runner system 12b. The runner system 12b includes a primary runner 16b for receiving melt from a melt source (not shown). At a first branch 18b, the primary runner 16b branches into two secondary runners 20b. The secondary runners 20b, at respective second branches 22b, then branch into tertiary runners 24b. The tertiary runners 24b supply melt to associated nozzles (not shown), which inject the melt into associated mold cavities (not shown).

In the description that follows, like reference numerals are used to refer to analogous elements of the runner systems 12a and 12b of the injection molding apparatus 10 and the manifold 14b, respectively. The runner systems 12,12b differ, however, both include primary 16,16b, secondary 20,20b, and tertiary 24, 24b runners, through which the melt flow characteristics are similar. FIGS. 2-8 are described with respect to the manifold 14b only for simplicity.

Figure 2:
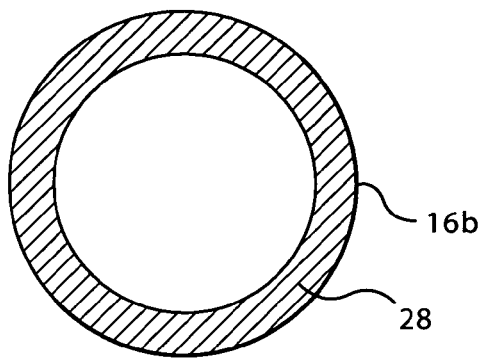
FIG. 2 is a view on A-A of FIG. 16.

Referring to FIG. 2, there is illustrated a sectional view of primary runner 16b at A-A of FIG. 1b. A heated peripheral portion 28 of the melt around the runner wall of the primary runner 16b is shown by shading. As can be seen from FIG. 2, the hotter melt adjoining the runner wall is substantially uniformly distributed about the runner wall.

Figure 3:
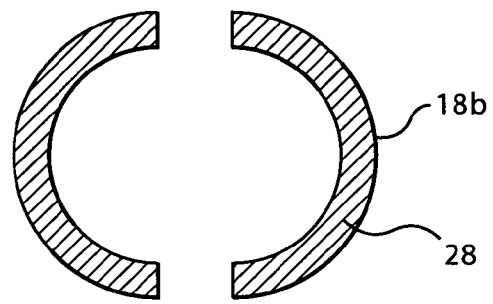
FIG. 3, in a sectional view, illustrates the melt flow in a primary runner of the hot runner manifold of FIG. 1b as it branches into a pair of secondary runners.

At the first branch 18b, the heated peripheral portion 28 of the flow is divided into two, as shown in FIG. 3. Each of these halves of the heated periphery then flows into the secondary runners 20b of the manifold 14b.

Figure 4:
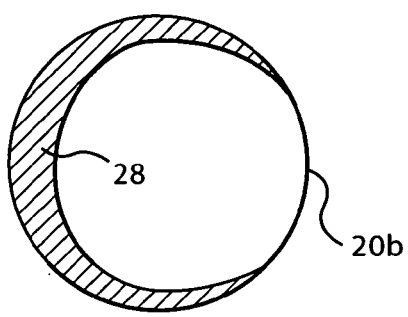
FIG. 4, is a view on B-B of FIG. 16.
Figure 5:
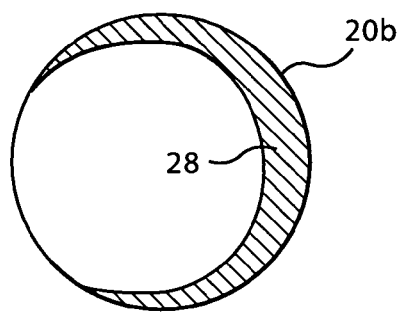
FIG. 5, is a view on C-C of FIG. 16.

Referring to FIGS. 4 and 5, there is illustrated in sectional views, the melt flow at sections B-B and C-C in the secondary runners 20b of FIG. 1b. As shown in FIGS. 4 and 5, in the secondary runners 20b, the heated periphery 28 is no longer substantially uniformly distributed about the runner wall. Instead, the portion of the runner wall that is closer to the side at which the primary runner 16b connects to the secondary runner 20b receives most of the heated periphery 28 from the primary runner 16b. Consequently, this side of the secondary runner 20b will have more heated melt than the opposite side of the secondary there of. However, as both secondary runners 20b receive substantially the same proportions of heated and relatively unheated melt, there will be substantially equal mass flow through the two secondary runners 20b. This will not, necessarily, be the case where the secondary runners 20b branch at the second branch 22b into the tertiary runners 24b.

Figure 6:
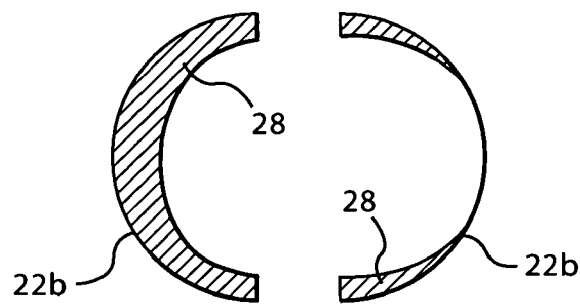
FIG. 6, in a sectional view, illustrates the melt flow of FIG. 4 as the secondary runner branches into a pair of tertiary runners.
Figure 7:
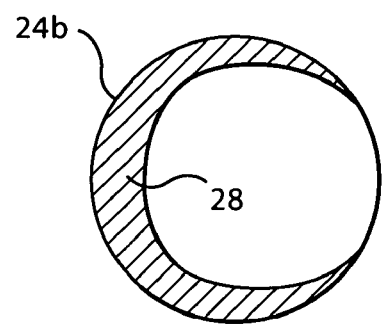
FIG. 7, is a view on D-D on FIG. 1b.

Referring to FIG. 6, melt flow downstream from section B-B, at the second branch 22b where the secondary runner 20b branches into two tertiary runners 24b, is illustrated. As can be seen from the sectional view, the heated peripheral portion 28 is more symmetrical than it was at the section B-B, due to heating of the relatively unheated side; however, there remains a substantial asymmetry in terms of the degree of heating on either side of the secondary runner 20b. This substantial asymmetry is, at the second branch 22b, unequally divided as shown in FIG. 6. Referring to FIG. 7 and to FIG. 8, the downstream consequences of this asymmetric division are illustrated in the sectional views D-D and E-E.

Figure 8:
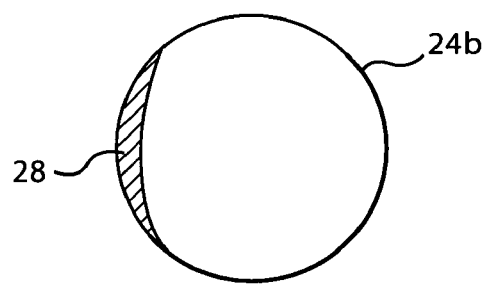
FIG. 8, is a view on E-E of FIG. 1b.

Referring to FIG. 7, the sectional view D-D illustrates that this tertiary runner 24b receives a disproportionate share of the heated peripheral melt 28, while the sectional view E-E shown in FIG. 8 indicates that the opposite tertiary runner 24b receives substantially less of the heated peripheral melt 28. The heated melt moves faster as it is less viscous. As a result, the tertiary runner 24b including section D-D will receive more melt than the tertiary runner 24b including section E-E, resulting in a flow imbalance between the nozzles and cavities supplied by these respective tertiary runners 24b. A similar situation arises with respect to the tertiary runners 24b fed by the opposite secondary runner 20b.

Figure 9:
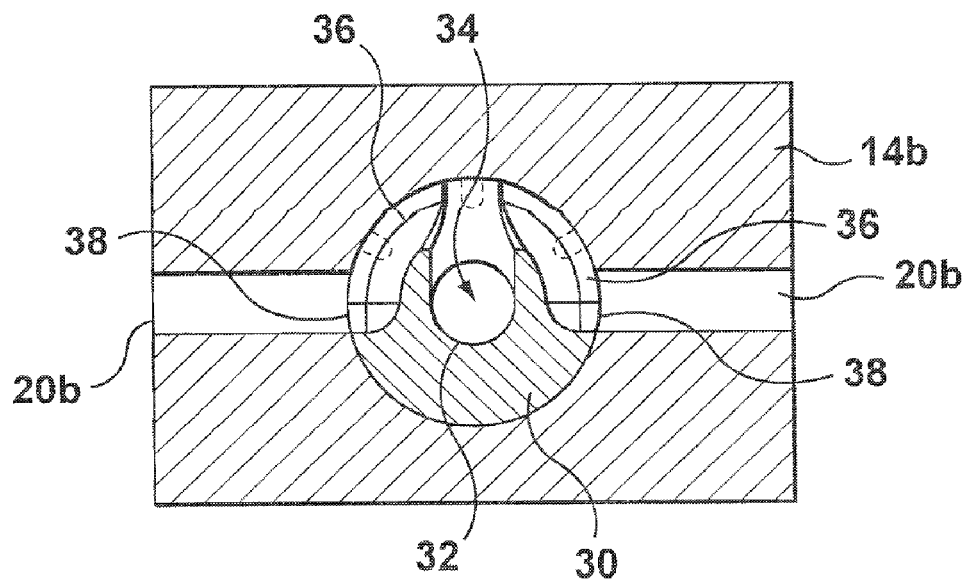
FIG. 9, is a sectional view on p-p of FIG. 10 a flow-rotating plug in accordance with an embodiment of the invention.
Figure 10:
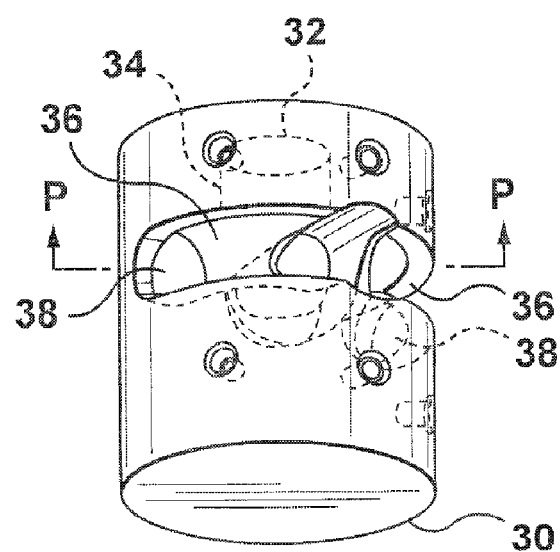
FIG. 10, in a perspective view, illustrates the flow-rotating plug of FIG. 8.

Referring to FIG. 9, there is illustrated in a sectional view on P-P of FIG. 10, a flow-rotating plug 30 in accordance with an embodiment of the invention. The flow rotating plug 30 is installed at the juncture of the primary runner 16b and the pair of secondary runners 20b in the manifold 14b. The flow-rotating plug 30 includes an inlet 32 and an inlet conduit 34 that branches into two outlet conduits 36. Each of the outlet conduits 36 leads to a separate outlet 38. The inlet conduit 34 follows an arcuate path. As a result, the intersection of the axis of the inlet conduit 34 with the axes of the two outlet conduits 36 is in a plane substantially perpendicular to the plane in which the primary runner 16b intersects the two secondary runners 20b. The outlet conduits 36 then curve back toward the secondary runners 20b, such that the outlets 38 release the melt into the secondary runners 20b. However, due to the plane of the branch within the plug 30 being perpendicular to the plane of the first branch 18b, the heated peripheral melt 28 will be rotated 90 degrees. Referring to FIG. 10, the plug 30 of FIG. 9 is shown in a perspective view with hidden details shown using dashed lines.

Figure 11A:
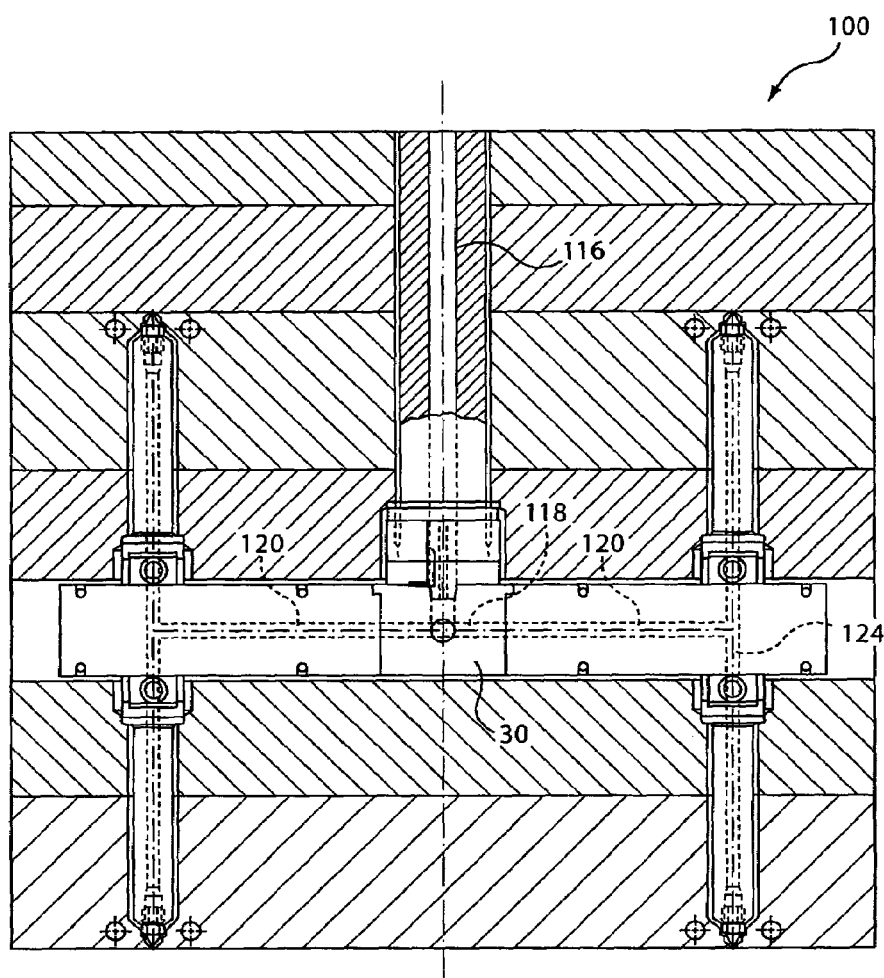
FIG. 11a, in a side view, illustrates a portion of a stack mold having the plug of FIG. 9 installed at the juncture of the primary runner with the pair of secondary runners.

Referring to FIG. 11a, another embodiment of a stack injection molding apparatus 100 is generally shown. The stack injection molding apparatus 100 is similar to the stack injection molding apparatus 10 of FIG. 1a, however, further includes the flow rotating plug 30 of FIG. 9. The plug 30 is installed at first branch 118 between primary runner 116 and secondary runners 120.

Figure 11B:
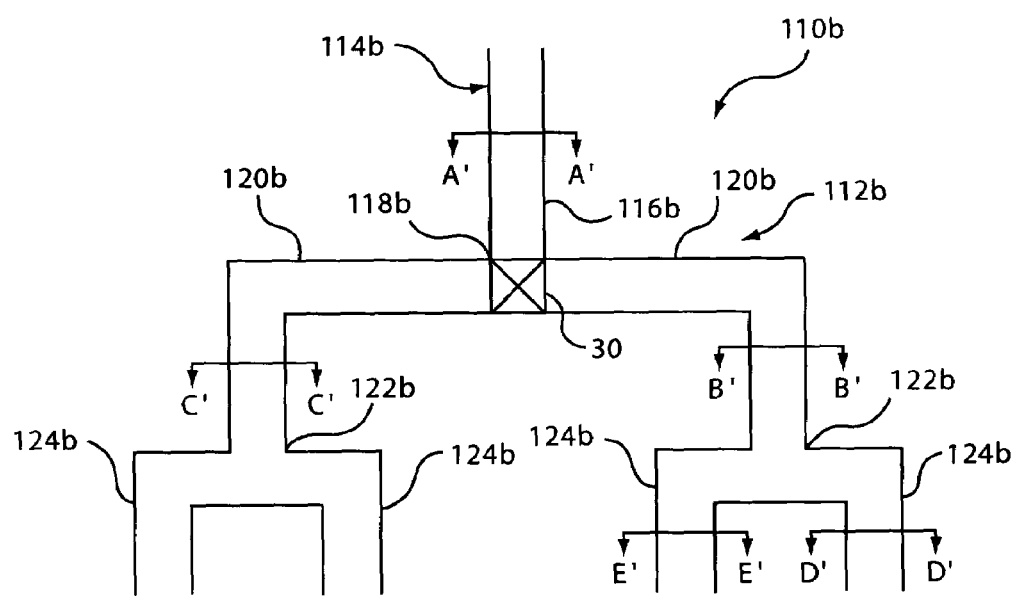
FIG. 11b, in a schematic side view, illustrates a manifold having the plug of FIG. 9 installed at the juncture of the primary runner with the pair of secondary runners.

Referring to FIG. 11b, a manifold 114b incorporating the flow-rotating plug 30 of FIG. 9 is shown at a first branch 118b between a primary runner 116b and a pair of secondary runners 120b in the runner system 112b.

The melt flow through the primary 116b, secondary 120b and tertiary 124b runners will now be described with respect to FIGS. 12-18 it will be appreciated that the melt flow through the primary 11b, secondary 120 and tertiary 124 runners of FIG. 11a is similar and therefore will not be described separately.

Figure 12:
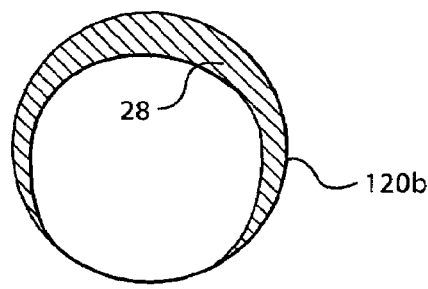
FIG. 12 is a view on B'-B' of FIG. 11b.
Figure 13:
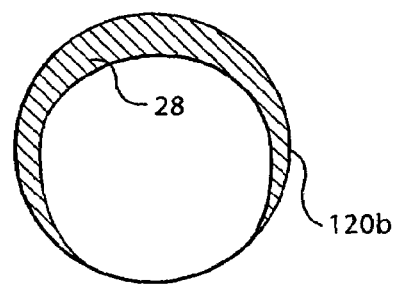
FIG. 13 is a view on C'-C' of FIG. 11b.

The section of the melt taken at A'-A' in FIG. 11b showing the melt in the primary runner 116b upstream from the first branch 118b and the plug 30 will be the same as the section A-A shown in FIG. 2. However, downstream from the first branch 118b and plug 30, the sectional views differ. Referring to FIG. 12, there is illustrated in a sectional view, the melt in the secondary runner 120b at section B'-B'. The heated peripheral portion 28 of the secondary runner 120b is shown as shaded in. Comparing FIG. 12 to FIG. 3, it is apparent that the shaded portion has been rotated 90 degrees. Similarly, the sectional view at C'-C' of FIG. 11b is shown in FIG. 13. Compared to the analogous sectional view C-C shown in FIG. 4, the sectional view C'-C' shown in FIG. 13 is rotated 90 degrees. In FIG. 11b, the shaded portions at sections B'-B' and C'-C' are both in the plane of the page, as opposed to being in a plane perpendicular to the page. Consequently, they will both be evenly divided at a second branch 122b where the secondary runners 120b divide into respective pairs of tertiary runners 124b. Each of the tertiary runners 124b in turn supplies melt to an associated nozzle (not shown).

Figure 14:
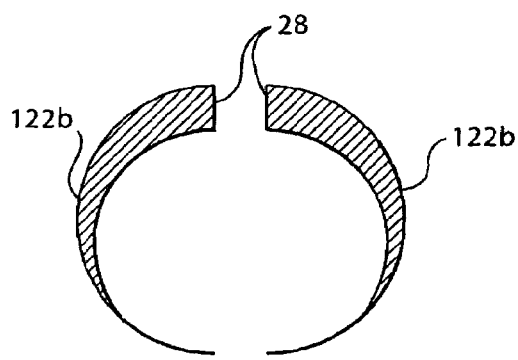
FIG. 14 in a sectional view, illustrates the melt flow in the secondary runner of FIG. 12 as this melt flow is divided between two tertiary runners.
Figure 15:
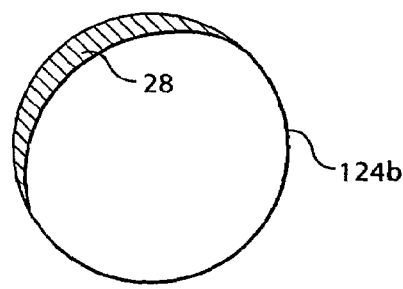
FIG. 15 is a view on D'-D' of FIG. 11b.
Figure 16:
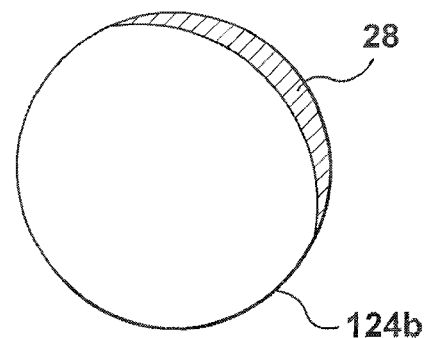
FIG. 16 is a view on E'-E' of FIG. 11b.

Referring to FIG. 14, there is illustrated in a sectional view, melt downstream from the sectional view B'-B' at the second branch 122b where the secondary runner 120b branches into two tertiary runners 124b. As with the sectional view of FIG. 6, the melt is asymmetrically distributed about the periphery of the secondary runner 120b. However, in FIG. 14, this asymmetrical distribution is symmetrically divided such that each of the tertiary runners 124b will receive substantially equal halves of the heated melt. Referring to FIGS. 15 and 16, there is illustrated in sections D'-D' and E'-E' respectively, the melt flow in the tertiary runners 124b. As is apparent from FIGS. 15 and 16, the heated melt is substantially equally divided between these two tertiary runners 124b. Accordingly, the amount of melt provided to the associated nozzles by these tertiary runners 124b will be substantially equal, and of substantially the same temperature.

According to other embodiments of the invention, the flow is not rotated between the primary runner 116b and secondary runners 120b, but is instead rotated between the secondary runners 120b and tertiary runners 124b. However, this requires a different configuration of flow-rotating plug 30.

Figure 17:
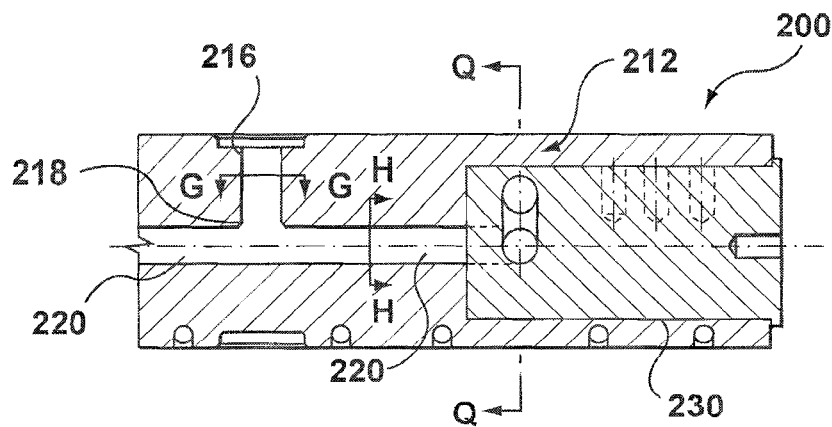
FIG. 17, in a side sectional view, illustrates a portion of a stack mold injection molding apparatus having a second plug in accordance with a further aspect of the present invention installed at the juncture of a secondary runner with its downstream tertiary runners.
Figure 18:
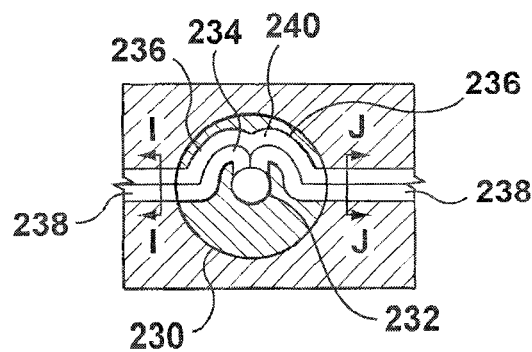
FIG. 18, in a sectional view on Q-Q of FIG. 17, illustrates the second plug.
Figure 19:
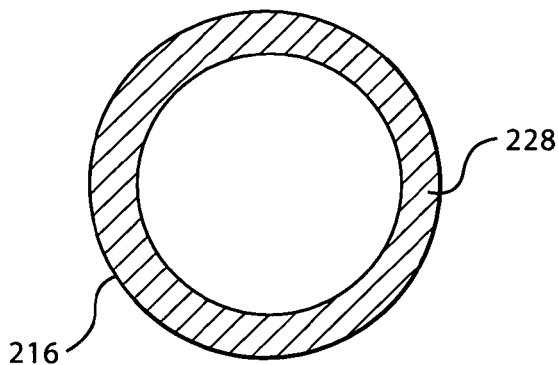
FIG. 19, is a view on G-G of FIG. 17.
Figure 20:
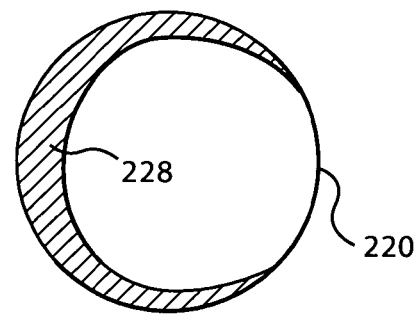
FIG. 20, is a view on H-H of FIG. 17.

Referring to FIG. 17, there is illustrated in a sectional view a portion of a runner system 212 of a stack injection molding apparatus 200. The stack injection molding apparatus 200 is similar to the stack injection molding apparatus 10 of FIG. 1a, however, it incorporates a second plug 230 in accordance with a further embodiment of the invention. The plug 230 could alternatively be installed in the manifold 14b, 114b of FIGS. 16 and 11b, respectively. This second plug 230 is also illustrated in the sectional view of FIG. 18, which is taken on Q-Q of FIG. 17. The section of the melt taken in a primary runner 216 upstream from a first branch 218 between the primary runner 216 and the secondary runners 220 at section G-G is shown in FIG. 19. As shown, this section is the same as the section A-A as shown in FIG. 2. In the runner system 212, there is no plug between the primary runner 216 and the secondary runners 220. Accordingly, the section H-H in the secondary runner 220 upstream from the second plug 230 as shown in FIG. 20 is the same as the section B-B shown in FIG. 4. Thus, as shown in FIGS. 7 and 8, a heated peripheral portion 228 will be unequally divided between tertiary runners 224 (shown in FIGS. 21 and 22) unless it is rotated. Accordingly, in FIG. 17, the second plug 230 is installed at the juncture between the secondary runner 220 and tertiary runners 224 to rotate the heated peripheral portion 228 such that it is equally divided between the two downstream tertiary runners 224.

Figure 21:
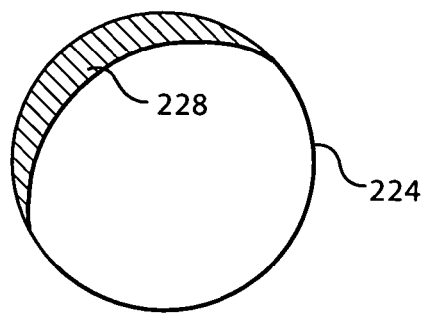
FIG. 21, is a view on I-I of FIG. 18.
Figure 22:
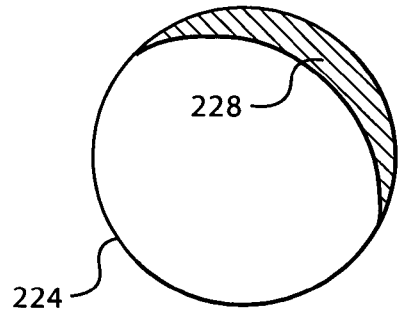
FIG. 22, is a view on J-J of FIG. 18.

Referring back to FIG. 18, the second plug 230 includes an inlet 232, an inlet passage 234, two outlet passages 236 in fluid communication with the inlet passage 234, an internal branch 240 between the inlet passage 234 and the two outlet passages 236, and two outlets 238 at the downstream ends of the two outlet passages 236. The inlet passage 234 is curved, and the internal branch 240 is located, so as to substantially equally divide the peripheral heated portion 228 in the inlet passage 234 between the two outlet passages 236. As a result, substantially equal amounts of flow are provided to the tertiary runners 224 via the outlet passages 236 and outlets 238 of the second plug 230. Sections of the melt downstream from the second plug 230 at sections I-I and J-J are shown in FIGS. 21 and 22 respectively. As can be seen from FIGS. 21 and 22, the peripheral heated portion 228 of the melt is equally divided between the tertiary runners 224.

Some stack molds and manifolds may comprise more than three levels of runners. That is, in addition to primary, secondary and tertiary runners, they may include quaternary runners. In such runner systems, each of the tertiary runners branches into a quaternary runner, which quaternary runner in turn supplies melt to an associated nozzle. In such hot runner systems, depending on the asymmetry existing in the tertiary runner, it may be necessary to include secondary plugs downstream from a primary plug, which primary plug may be the plug of FIG. 9 or the plug of FIG. 17. That is, the primary plug rotates an initial asymmetry such that it is symmetrically divided between tertiary runners. However, the secondary plug must subsequently rotate that asymmetry in the tertiary runners to ensure that it is substantially equally divided between the quaternary runners. Unlike the above-described primary plugs, this secondary plug does not rotate the flow by 90 degrees, as the asymmetry must only be rotated 45 degrees in one direction or 135 degrees in the other direction, to be symmetrically divided between the two quaternary runners.

Figure 23:
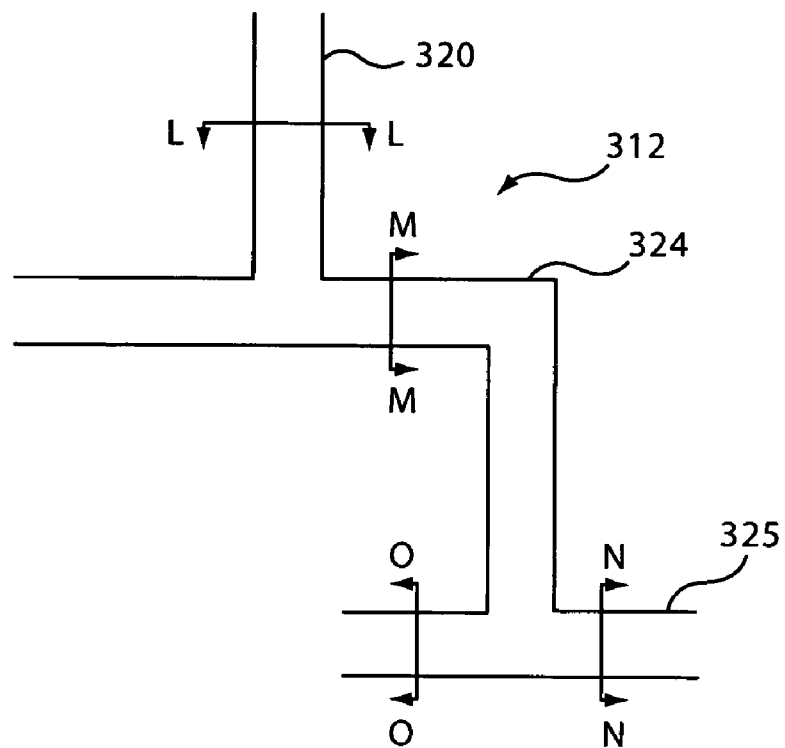
FIG. 23, in a schematic view, illustrates a portion of a hot runner system in accordance with an aspect of the invention.

Referring to FIG. 23, there is illustrated in a schematic view, a runner system 312 of a stack injection molding apparatus in accordance with an aspect of the present invention. Melt within a secondary runner 320 of the runner system 312 of FIG. 23 is illustrated in the sectional view of FIG. 24 along the line L-L. As is apparent from FIG. 24, the melt within the secondary runner 320 has been rotated such that it is aligned for a substantially equal division between the tertiary runners 324 downstream from the secondary runner 320.

Figure 25:
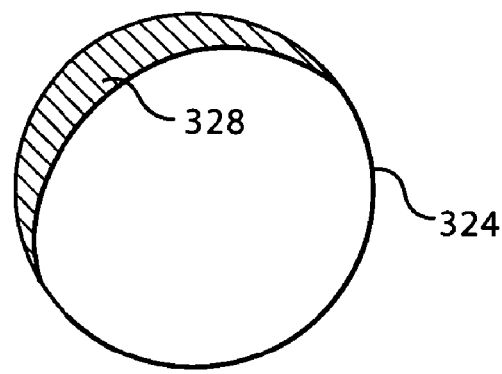
FIG. 25, is a view on M-M of FIG. 23.
Figure 26:
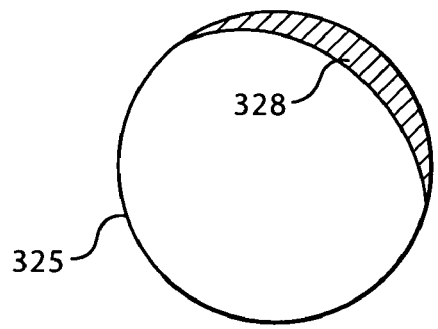
FIG. 26, is a view on N-N of FIG. 23.
Figure 27:
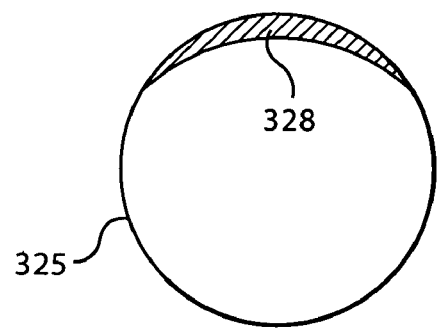
FIG. 27, is a view on O-O of FIG. 23.

Melt flow at a section M-M of a tertiary runner 324 downstream from the secondary runner 320 is shown in FIG. 25. From this drawing, it is apparent that the heated peripheral portion 328 at section M-M is not positioned for equal division between quaternary runners 325 downstream from this tertiary runner 324. Melt flow within one of these quaternary runners 325 at section N-N is illustrated in FIG. 26, and melt flow in the other of these quaternary runners 325 at section O-O is illustrated in FIG. 27. As can be seen from these figures, the peripheral heated portion 328 shown in FIG. 25 is unequally divided between these quaternary runners 325, as the melt shown in FIG. 26 includes more of this heated peripheral portion 328 than the melt shown in FIG. 27. As a result, there may be preferential melt flow to the quaternary runner 325 of FIG. 26.

Figure 28:
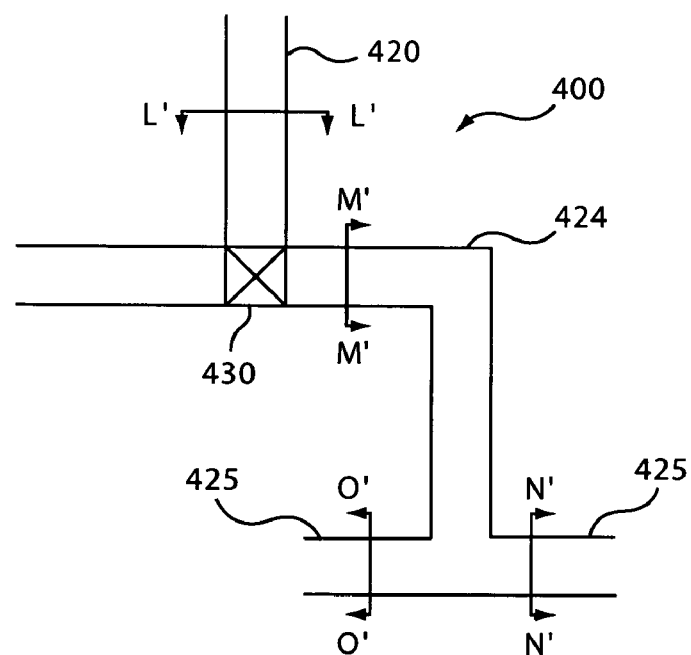
FIG. 28, in a schematic view, illustrates a hot runner system incorporating an auxiliary plug in accordance with a further aspect of the present invention.
Figure 29:
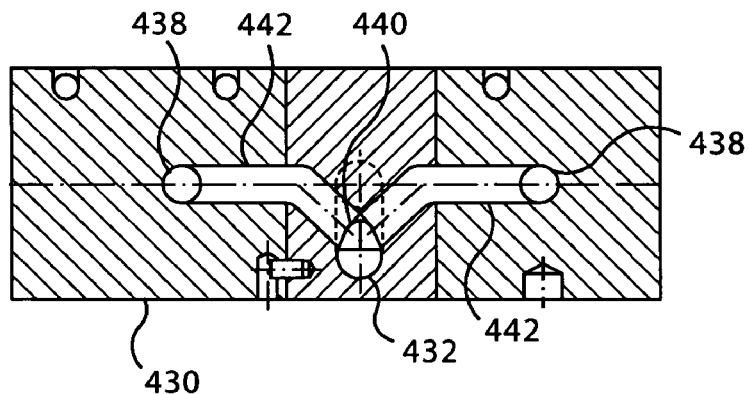
FIG. 29, in a sectional view, illustrates the auxiliary plug of FIG. 28.

Referring to FIG. 28, there is illustrated in a schematic diagram a runner system 400 of a stack injection molding apparatus including an auxiliary plug 430 (shown in FIG. 29) in accordance with a further aspect of the present invention. Referring to FIG. 29, this auxiliary plug 430 is illustrated in a sectional view. The auxiliary plug 430 includes an auxiliary plug inlet 432, an auxiliary plug branch 440, and two auxiliary plug outlets 438. However, instead of including a 90 degree bend, the auxiliary plug 430 includes two 45 degree bends. In operation, the auxiliary plug 430 is installed at the juncture of secondary runner 420 and tertiary runners 424. The auxiliary plug branch 440, which divides the melt flow from the secondary runner 420 into two auxiliary plug passages 442 including 45 degree bends. As a result, the peripheral heated portion 428 in the tertiary runners 424 is rotated by 45 degrees to be aligned for substantially equal division between the downstream quaternary runners 425.

Figure 24:
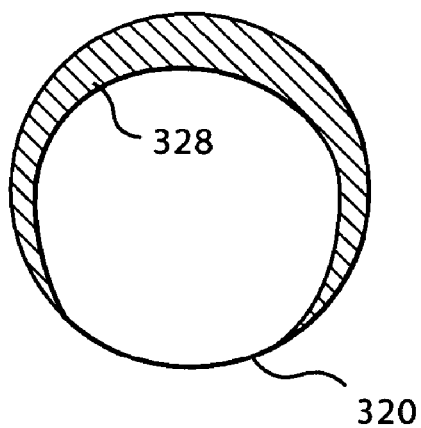
FIG. 24, is a view on L-L of FIG. 23.
Figure 30:
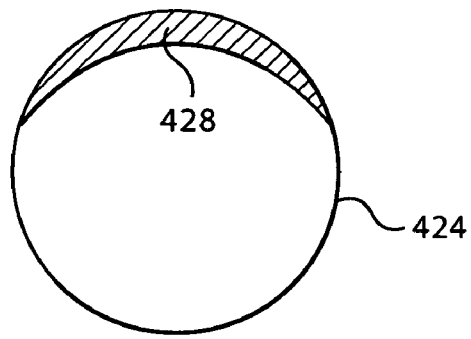
FIG. 30, is a view on M'-M'- of FIG. 28.
Figure 31:
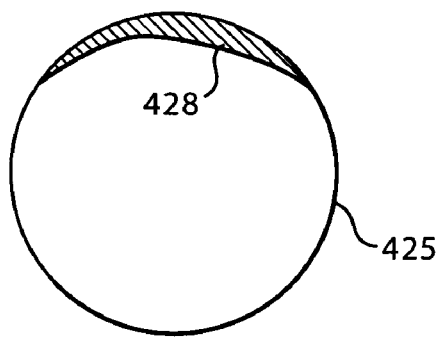
FIG. 31, is a view on N'-N' of FIG. 28.
Figure 32:
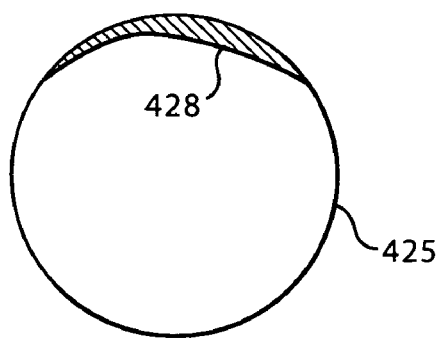
FIG. 32, is a view on O'-O' of FIG. 30.

Referring to FIG. 30, there is illustrated in a sectional view, the melt flow at section M'-M' downstream from the auxiliary plug 430 (the melt flow at section L'-L' upstream from the auxiliary plug 430 is unchanged from that of FIG. 24). As shown, the melt flow has been rotated by 45 degrees from the melt flow shown at the same location in FIG. 25. When this melt flow reaches the juncture of the tertiary runner 424 with the two quaternary runners 425, it will be equally divided between the quaternary runners 425 due to its position. The melt flow in one of the quaternary runners 425 downstream from this tertiary runner 424 is shown at section N'-N' in FIG. 31, and the melt flow in the other of the quaternary runners 425 downstream from this tertiary runner 424 at section O'-O' is shown in FIG. 32. From a comparison of FIGS. 31 and 32, it is apparent that the melt flow has been symmetrically divided between the two quaternary runners 425. From FIGS. 31 and 32, it is also apparent that the shear-heated peripheral portion 428 at both sections N'-N' and O'-O' are positioned to be symmetrically divided if the quaternary runners 425 subsequently branch into two downstream runners that run substantially parallel to the tertiary runner 424. However, this is not required if the quaternary runners 425 supply melt directly to their associated nozzles, but this is only an incidental feature resulting from the way the shear-heated portion 428 of the melt in the tertiary runner 424 is divided between the two quaternary runners 425.

While the preferred embodiments are described above, it will be appreciated that the present invention is susceptible to modification and change without departing from the fair meeting of the accompanying claims. For example, instead of the auxiliary plug being positioned at the juncture of the secondary runner and tertiary runners, auxiliary plugs might be positioned at the juncture of the tertiary runners and the quaternary runners, or positioned solely within the tertiary runners. Further, the invention may be implemented without using plugs. Instead of plugs, the runners in the manifold of stack mold may be configured in the same way as the plugs to rotate the melt for equal division between downstream runners. The purpose, in every case, is simply to rotate the melt within the relevant runner such that it is symmetrically divided in the next runner, or, such that it is aligned in the next runner for subsequent symmetric division in the runners immediately downstream from the next runner. All such modifications or variations are believed to be within the sphere and scope of the invention as defined by the claims appended hereto.

The invention claimed is:

1. An injection molding apparatus comprising:
   a hot runner system for supplying a stream of melt, the hot runner system having
      an upstream melt passage,
      a pair of downstream melt passages downstream from the upstream melt passage and disposed substantially transverse to the upstream melt passage; and
      a separate flow rotator disposed at a first junction between the upstream melt passage and the pair of downstream melt passages, wherein the flow rotator is substantially cylindrical and includes:
         an inlet aligned with the upstream melt passage to receive the melt stream from the upstream melt passage,
         an inlet passage receiving melt from the inlet and following an arcuate path such that a downstream portion of the inlet passage is substantially perpendicular to the upstream melt passage where the melt stream enters the inlet, and
         a first outlet passage and a second outlet passage communicating with the inlet passage such that the flow of melt is split into two streams at a second junction between the inlet passage and the outlet passages, wherein each outlet passage has a curved path from the second junction to a respective first and second outlet, wherein the first and second outlets are disposed on opposite sides of the flow rotator, wherein the first and second outlets each communicate with a respective one of the pair of downstream melt passages such that melt flow from the upstream melt passage is substantially equally divided to flow in opposite directions in the pair of downstream melt passages; and
   a plurality of hot runner nozzles in communication with and downstream from the downstream melt passages.

2. The injection molding apparatus as defined in claim 1, wherein the hot runner system is disposed in a manifold.

3. The injection molding apparatus as defined in claim 1, wherein the hot runner system is disposed in a stack mold.

4. The injection molding apparatus as defined in claim 1 wherein the flow path is non-planar.

5. The injection molding apparatus as defined in claim 4 wherein the first junction is disposed in a first plane and the second junction is disposed in second plane parallel to and above the first plane, wherein the first and second outlet passages are curved such that the melt returns to the first plane at the first and second outlets.

6. The injection molding apparatus as defined in claim 1 wherein the flow rotator comprises a one-piece body.

7. The injection molding apparatus as defined in claim 6 wherein the one-piece body comprises an integral heating element.

8. In a hot runner system for supplying a laminar flowing material, the hot runner system having an upstream melt passage and a pair of downstream melt passages downstream from and substantially transverse to the upstream melt passage; a flow-rotator for rotating a cross-sectional asymmetrical condition of a laminar flowing material in the hot runner system, the flow rotator comprising:

an inlet for receiving the laminar flowing material;

an inlet passage for receiving the laminar flowing material from the inlet, the inlet passage bending such that a downstream portion of the inlet passage is substantially perpendicular to the upstream passage where the laminar flowing material enters the inlet; and first and second outlet passages communicating with the inlet passage such that the laminar flowing material is split into two streams at a junction between the inlet passage and the outlet passages, wherein each outlet passage has a curved path from the junction to a respective first and second outlet, wherein the first and second outlets each communicate with a respective one of the pair of downstream melt passages such that the laminar flowing material from the upstream melt passage is substantially equally divided to flow in opposite directions in the pair of downstream melt passages, wherein the flow rotator is a substantially cylindrically shaped plug.

9. The flow rotator as defined in claim 8 wherein the junction is offset from a plane including the upstream melt passage and the pair of downstream melt passages.

10. The flow rotator as defined in claim 8, wherein the flow rotator comprises one-piece body, wherein the inlet, the inlet passage, the outlet passages and the two outlets are formed in the one-piece body.

11. The flow rotator as defined in claim 10 wherein the one-piece body comprises an integral heating element.

12. An injection molding apparatus comprising:

an injection manifold having a first melt channel and a second melt channel, wherein the second melt channel is substantially transverse with respect to the first melt channel;

a separate plug having a cylindrical body disposed within the manifold at a first junction between the first melt channel and the second melt channel, the separate plug including:

an inlet aligned with the first melt channel and having an unrestricted flow path to receive a stream of melt flowing through the manifold, an inlet passage following an arcuate path such that a downstream portion of the inlet passage is substantially perpendicular to the first melt channel where the melt stream enters the inlet, and a first outlet passage and a second outlet passage communicating with the inlet passage such that the flow of melt is split into two streams at a second junction between the inlet passage and the outlet passages, wherein each outlet passage has a curved path from the second junction a respective first and second outlet, wherein the first and second outlets are disposed on opposite sides of the plug, wherein the first and second outlets each communicate with the second melt channel such that melt flow from the first melt channel is substantially equally divided to flow in opposite directions in the second melt channel.

13. The injection molding apparatus as defined in claim 12, wherein the second junction is offset from a plane including the first melt channel and the second melt channel.

14. An injection molding apparatus comprising:

an injection manifold having a primary runner and two secondary runners, a plane defined by the primary runner and the secondary runners; and a flow rotating plug installed in the injection manifold to connect the primary runner and the secondary runners, the flow rotating plug defining:

an inlet conduit having an arcuate path extending between an inlet and an intersection offset from the plane, the inlet being connected to the primary runner; and two outlet conduits, each outlet conduit extending in a curve from the intersection back to the plane and to a respective outlet connected to a respective one of the secondary runners.

15. The injection molding apparatus as defined in claim 14, wherein the flow rotating plug comprises a one-piece body defining the inlet conduit and the two outlet conduits.

16. The injection molding apparatus as defined in claim 14, wherein an axis of the inlet conduit at the intersection is substantially perpendicular to the plane.

17. The injection molding apparatus as defined in claim 14, wherein the two outlet conduits are fully defined by the flow rotating plug.

18. The injection molding apparatus as defined in claim 14, wherein the two outlet conduits are partially defined by the injection manifold.

* * * * *